(12) United States Patent
Choi et al.

(10) Patent No.: US 7,299,065 B2
(45) Date of Patent: Nov. 20, 2007

(54) METHOD FOR TRANSMITTING HSDPA SERVICE INFORMATION IN A CDMA MOBILE COMMUNICATION SYSTEM

(75) Inventors: Sung-Ho Choi, Songnam-shi (KR); Hyeon-Woo Lee, Suwon-shi (KR); Kook-Heui Lee, Songnam-shi (KR); Seong-Hun Kim, Seoul (KR); Jin-Weon Chang, Yongin-shi (KR); Joon-Goo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 271 days.

(21) Appl. No.: 10/183,867

(22) Filed: Jun. 27, 2002

(65) Prior Publication Data
US 2003/0002472 A1    Jan. 2, 2003

(30) Foreign Application Priority Data
Jun. 29, 2001  (KR) .......................... 2001-0041406

(51) Int. Cl.
*H04B 7/00* (2006.01)
(52) U.S. Cl. .............. 455/525; 370/311; 370/442; 370/349
(58) Field of Classification Search ............. 455/407, 455/408, 552.1; 370/342, 311, 442, 349
See application file for complete search history.

(56) References Cited

U.S. PATENT DOCUMENTS

| | | | | |
|---|---|---|---|---|
| 5,404,355 A | * | 4/1995 | Raith | .......................... 455/418 |
| 5,566,357 A | * | 10/1996 | Holcman | .................... 455/445 |
| 5,966,657 A | * | 10/1999 | Sporre | ........................ 455/425 |
| 5,996,657 A | * | 12/1999 | Riesselman | ................ 144/235 |
| 6,075,778 A | | 6/2000 | Sugita | |
| 6,085,069 A | | 7/2000 | Sharpe | |
| 6,600,917 B1 | * | 7/2003 | Maupin | .................. 455/414.1 |
| 6,628,946 B1 | * | 9/2003 | Wiberg et al. | ............. 455/434 |
| 2001/0009543 A1 | * | 7/2001 | Park et al. | .................. 370/331 |
| 2002/0064140 A1 | * | 5/2002 | Numminen | ................ 370/311 |

(Continued)

FOREIGN PATENT DOCUMENTS

EP           0 939 569           9/1999

(Continued)

OTHER PUBLICATIONS

UK Search and Examination Report dated Sep. 12, 2003 issued in a counterpart application, namely Appln. No. GB0214605.8.

(Continued)

*Primary Examiner*—Erika A. Gary
*Assistant Examiner*—Phuoc Doan
(74) *Attorney, Agent, or Firm*—The Farrell Law Firm, P.C.

(57) ABSTRACT

A method for transmitting information in a mobile communication system using HSDPA (High Speed Downlink Packet Access) service. When an RNC (Radio Network Controller) generates or changes HSDPA service-related information, it transmits the generated or changed information to a Node B and a UE along with an indicator indicating the change in the HSDPA service information. Therefore, the Node B and the UE simultaneously operate by receiving the generated or changed information, resulting in an increase in the HSDPA service efficiency.

18 Claims, 6 Drawing Sheets

U.S. PATENT DOCUMENTS

2002/0141436 A1* 10/2002 Toskala .................. 370/442

FOREIGN PATENT DOCUMENTS

| JP | 05-235816 | 9/1993 |
|----|-----------|--------|
| JP | 2000-031899 | 1/2000 |
| WO | WO 98/28931 | 7/1998 |
| WO | WO 98/39929 | 9/1998 |
| WO | WO 02/01769 | 1/2002 |
| WO | WO 03/035423 | 5/2003 |

OTHER PUBLICATIONS

Lucent Technologies: Text Proposal for the HSDPA Technical Report, TSG-RAN Working Group 1.

Lucent Technologies: Downlink and Uplink Channel Structures for HSDPA, TSG-RAN Working Group 1.

Universal Mobile Telecommunications System (UMTS) ; Physical Layer Procedures (FDD) , Sep. 2000.

* cited by examiner

METHOD FOR TRANSMITTING HSDPA SERVICE INFORMATION IN A CDMA MOBILE COMMUNICATION SYSTEM

PRIORITY

This application claims priority to an application entitled "Method for Transmitting HSDPA Service Information in a CDMA Mobile Communication System" filed in the Korean Industrial Property Office on Jun. 29, 2001 and assigned Serial No. 2001-41406, the contents of which are incorporated herein by reference.

BACKGROUND OF THE INVENTION

1. Field of the Invention

The present invention relates generally to a mobile communication system using an HSDPA (High Speed Downlink Packet Access) service, and in particular, to a method for notifying all UEs (User Equipments) being provided with an HSDPA service of a change in HSDPA service information when the HSDPA service information is changed.

2. Description of the Related Art

In general, HSDPA refers to a technique for transmitting data including HS-DSCH (high-speed downlink shared channel) related control channels in a UMTS (Universal Mobile Telecommunication System) communication system. In order to support the HSDPA technique, an AMC (Adaptive Modulation and Coding) technique, a HARQ (Hybrid Automatic Retransmission Request) technique, and an FCS (Fast Cell Select) technique have been proposed. The AMC, HARQ and FCS techniques newly proposed to support the HSDPA technique will be described in detail herein below.

1) AMC Technique

The AMC technique is a data transmission technique for adaptively determining a modulation mode and a coding mode of different data channels according to a channel condition between a specific Node B and a UE (User Equipment), thereby increasing the overall utilization efficiency of the Node B. Therefore, the AMC technique has a plurality of modulation schemes and a plurality of coding schemes, and modulates and codes data channels by combining the modulation schemes and the coding schemes. Generally, each of combinations of the modulation schemes and the coding schemes are called "MCSs (Modulation and Coding Schemes)", and there are a plurality of MCSs with level #1 to level #n according to the number of combinations of the modulation schemes and the coding schemes. In other words, the AMC technique adaptively determines a level of the MCS according to a channel condition between the Node B and the UE currently wirelessly connected to the Node B, thereby increasing the overall utilization efficiency of the Node B.

2) HARQ Technique

The HARQ, in particular n-channel SAW HARQ (n-channel Stop And Wait Hybrid Automatic Retransmission Request) technique, will now be described. For the HARQ technique, the following two plans to increase efficiency of an ARQ (Automatic Retransmission Request) technique have been proposed. In a first plan, the HARQ performs data retransmission request and response between the UE and the Node B. In a second plan, the HARQ temporarily stores errored data and then combines it with retransmission data of the corresponding data before transmission. In addition, the HSDPA technique has introduced the n-channel SAW HARQ technique in order to make up for the shortcomings of the conventional SAW ARQ (Stop And Wait ARQ) technique. The SAW ARQ technique transmits the next packet data only after receiving ACK (Acknowledgement) signal for the previous packet data. Therefore, in some cases, the SAW ARQ technique should await ACK, though it can presently transmit packet data. The n-channel SAW HARQ technique increases channel utilization efficiency by continuously transmitting a plurality of data packets before receiving the ACK for the previous packet data. That is, if it is possible to establish n logical channels between the UE and the Node B and identify the n channels according to time and channel numbers, the UE receiving the packet data can recognize the channel through which the received packet data was transmitted at a certain time, and take necessary measures by, for example, reassembling the received packet data in a desired order or soft-combining the corresponding packet data.

3) FCS Technique

The FCS technique rapidly selects a cell having a good channel condition among a plurality of cells, when a UE receiving an HSDPA service enters a cell-overlapped region, or a soft handover region. To be specific, if the UE receiving the HSDPA service enters a cell-overlapped region between an old Node B and a new Node B, then the UE establishes radio links to a plurality of the cells, i.e., a plurality of Node Bs. Here, a set of the cells, to which the radio links are established by the UE, is called an "active set". In the FCS technique, the UE receives HSDPA service packet data from only the cell maintaining the best channel condition among the cells included in the active set, thereby reducing the overall interference. Here, a cell transmitting the HSDPA service packet data for its best channel condition among the cells in the active set is called a "best cell". The UE periodically checks the channel conditions with the cells belonging to the active set. Upon detecting a cell having a channel condition better than that of the current best cell, the UE transmits a best cell indicator to all of the cells in the active set in order to replace the current best cell with a new best cell. The best cell indicator includes an identifier of the selected new best cell. Upon receiving the best cell indicator, the cells belonging to the active set analyze the cell identifier included in the received best cell indicator to determine whether the received best cell indicator is destined for them. The selected best cell transmits packet data to the UE using the HS-DSCH.

As mentioned above, in the HSDPA technique, the UE and the Node B are required to exchange the following new control signals in order to use the newly introduced techniques, i.e., the AMC, HARQ and FCS techniques. First, in order to support the AMC technique, the UE informs the Node B of information on the channel between the UE itself and the Node B, and the Node B informs the UE of an MCS level determined according to the channel condition based on the channel information received from the UE. Second, in order to support the n-channel SAW HARQ technique, the UE transmits ACK or NACK (Negative Acknowledgement) signal to the Node B. Third, in order to support the FCS technique, the UE transmits to the Node B a best cell indicator indicating a Node B providing a channel having the best channel condition, i.e., a best cell. In addition, when the best cell is replaced according to the channel condition, the UE informs the Node B of a packet data reception state at that time, and the Node B provides necessary information so the UE can correctly select the best cell.

Information Group #1

Information Group #1 defines information that is transmitted from the Node B to the UE in order to support the HSDPA service. Information Group #1 includes:

1) HSDPA indicator: indicates whether there is HSDPA data for the UE to receive.

2) MCS level information: indicates a transmission technique to be used for the HS-DSCH.

3) HS-DSCH channelization code information: information related to a channelization code to be used for a specific UE by the HS-DSCH.

4) HARQ processor number: indicates a channel transmitting specific packet data among logical channels for the HARQ, when the n-channel SAW HARQ technique is used. Here, the reason for indicating the HARQ processor number is as follows. The n-channel SAW HARQ uses as many HARQ processors as the number n of the channels, so the corresponding packet data is transmitted over a specified one of the channels, and when an error occurs in the transmitted packet data, it must recognize the HARQ processor number corresponding to the errored packet data. That is, the HARQ processor corresponding to the channel number performs a retransmission process on the errored packet data out of the packet data transmitted over the corresponding channel.

5) HARQ packet data number: the Node B informs the UE of a downlink packet data number so that the UE can inform the selected new best cell of a transmission state of the HDSPA data when the best cell is replaced in the FCS technique. Here, the packet data has a SN (sequence number), so it is possible to identify the packet data using the sequence number.

6) UE ID (identification): the Node B indicates whether HS-SCCHs (High-Speed Shared Control Channels) contain control information for the corresponding UE using the UE identification, when part of the above information is transmitted over one or more HS-SCCHs.

In addition to Information Group #1, information that should be transmitted from the Node B to the UE in order to support the HSDPA service includes an uplink transmission power offset value. In some cases, the UE increases the uplink transmission power by an offset so that the adjacent Node Bs belonging to the active set other than the current best cell correctly receive the best cell information transmitted by the UE. In this case, the Node B informs the UE of the uplink transmission offset value. Further, information that is transmitted from the Node B to the UE in addition to Information Group #1 in order to support the HSDPA service includes retransmission information in the HARQ operation, or the number of retransmissions.

The information that is transmitted for the HSDPA service is uniquely provided to the UEs, and this information is transmitted to the UEs before transmission of an HS-DSCH signal that is to be transmitted to a corresponding UE. This is because the information that is transmitted for the HSDPA service is information indispensable for the HSDPA service and the UEs must receive this information in order to normally receive the HSDPA service. Accordingly, there is a need for a method of transmitting the HSDPA service information before transmission of actual packet data. However, the current asynchronous mobile communication system does not have information that is shared by all of the UEs and information on the changed contents that must be simultaneously applied by the UEs and the Node B. like the information used in the HSDPA technique. Thus, there is a demand for a method of transmitting changed information to the Node B and all of the UEs in order for all of the UEs and the Node B to simultaneously equally apply the changed contents in using the HSDPA technique.

SUMMARY OF THE INVENTION

It is, therefore, an object of the present invention to provide a method for transmitting HSDPA service information to all UEs in a communication system using an HSDPA technique.

It is another object of the present invention to provide a method for notifying all the UEs of a change in common information when the common information applied to all of the UEs is changed in a communication system using an HSDPA technique.

It is further another object of the present invention to provide a method for simultaneously applying changed information in a Node B and all UEs when common information applied to all of the UEs is changed in a communication system using an HSDPA technique.

To achieve the above and other objects, the present invention provides a method for transmitting information commonly applied to a plurality of UEs (User Equipments) in a cell occupied by a Node B connected to an RNC (Radio Network Controller) to the UEs. The method comprises generating changed information, when the commonly applied information is changed repeatedly transmitting to the EUs the changed information, and applying the changed information from a predetermined desired activation time point. An indicator may be included to indicate that the information has changed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
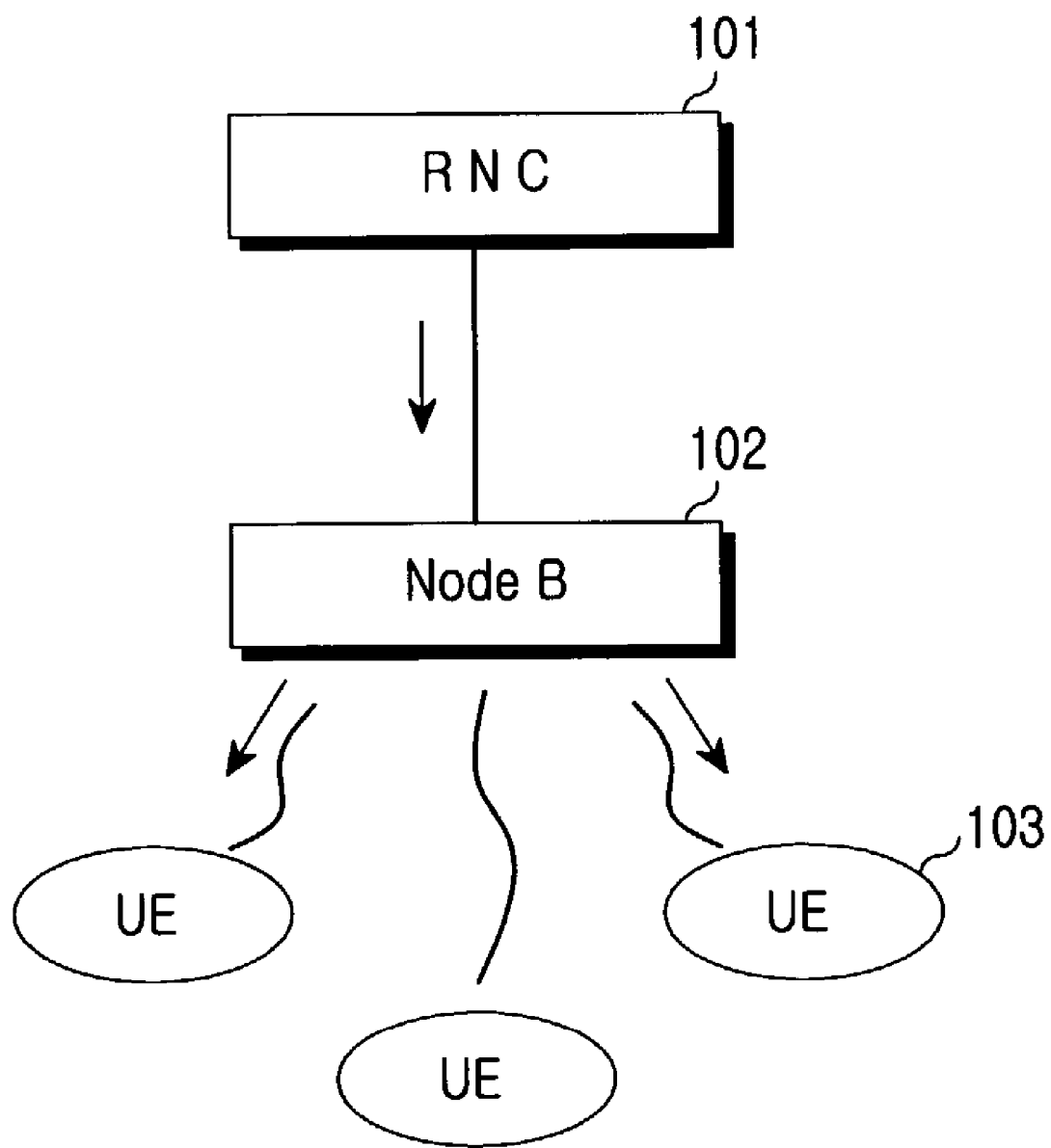
FIG. 1 schematically illustrates transmission directions in which the information commonly applied to all UEs is transmitted, according to an embodiment of the present invention.

A preferred embodiment of the present invention will be described herein below with reference to the accompanying drawings. In the following description, well-known functions or constructions are not described in detail since they would obscure the invention in unnecessary detail.

Before a description of the present invention, a definition of Information Group #2 will be given herein below. In a communication system using an HSDPA (High Speed Downlink Packet Access) service, information that is transmitted from a Node B to a UE (User Equipment) for the HSDPA service is defined as Information Group #1, as mentioned in the forgoing description. However, in addition to Information Group #1, information that is transmitted from an RNC (Radio Network Controller) to the UE for the HSDPA service is defined as Information Group #2.

Information Group #2

Information Group #2 includes:

1) HS-PDSCH (High Speed-Physical Downlink Shared Channel) code information: downlink code information assigned to a cell for transmitting the HS-PDSCH. The HS-PDSCH, indicating a physical channel transmitting HS-DSCH (High Speed-Downlink Shared Channel), is identified using a scrambling code and an OVSF (Orthogonal Variable Spreading Factor) code. When the HSDPA service is provided, one or more HS-PDSCHs can be assigned. In this case, all of the UEs recognize information on the unique codes for the HS-PDSCHs.

2) HS-SCCH (High Speed-Shared Control Channel) information: when the HSDPA service is provided, one or more HS-SCCHs can be assigned. In this case, all of the UEs also recognize information on the unique codes for the HS-SCCHs.

3) HS-PDSCH code power level information: HS-PDSCH code power level information is defined as either a relative power value or an absolute power value for a CPICH (Common Pilot Channel) code power level. In addition, the HS-PDSCH code power value is used in decoding the HS-PDSCH, and all of the UEs recognize the HS-PDSCH code power level before receiving actual packet data.

In addition to Information Group #2, information that is transmitted from the RNC to the UE in order to support the HSDPA service includes HARQ (Hybrid Automatic Retransmission Request)-related information and MCS (Modulation and Coding Scheme)-related information, and this information must also be previously recognized by all of the UEs. Further, when the number of HS-PDSCH codes providing the HSDPA service is increased due to an increase in an amount of service data, information on the increase in the number of the HS-PDSCH codes caused by the increase in the amount of the data service may also be added to Information Group #2. The information belonging to Information Group #2 is determined by the RNC, and the information determined by the RNC is transmitted to the Node B. The Node B then provides the HSDPA service based on the information received from the RNC. Also, the Node B transmits the information to all of the UEs being provided with the HSDPA service so that the UEs can be provided with the HSDPA service based on the transmitted information. After first being determined, Information Group #2 can be changed by the RNC considering a state of the cell. The information changed according to the state of the cell should be transmitted to the Node B and all of the UEs being provided with the HSDPA service. Further, the changed information should be simultaneously applied in the Node B and the UEs. In addition, when the information belonging to Information Group #2 is changed according to circumstances, the information belonging to Information Group #1 stated in the description of the prior art may also be changed due to the change in the information belonging to Information Group #2.

Now, a process of transmitting information that is commonly applied to all of the UEs, i.e., the information belonging to Information Group #2, to the UEs will be described with reference to FIG. 1.

FIG. 1 schematically illustrates transmission directions in which the information commonly applied to all of UEs is transmitted, according to an embodiment of the present invention. Referring to FIG. 1, an RNC 101 determines information commonly used by all of UEs, i.e., the information belonging to Information Group #2, in order to provide the HSDPA service in a Node B 102 connected to the RNC 101. The information determined by the RNC 101 is transmitted to the Node B 102, and the Node B 102 changes corresponding information during the HSDPA service according to the information received from the RNC 101. Here, the information transmitted from the RNC 101 to the Node B 102 is information necessary for performing the HSDPA service. In order to transmit the information, it is possible to use either an existing NBAP (Node B Application Part) message previously proposed between the RNC 101 and the Node B 102, or a new NBAP message. When the existing NBAP message is used, a Cell Setup Request message or a Common Channel Setup Request message for transmitting necessary information to one cell can be used. However, the information transmitted by the NBAP messages is generally different in properties from the information exchanged between the RNC 101 and the Node B 102, so the present invention defines a new NBAP message. The newly defined NBAP message will be defined as an HSDPA Setup Request message and an HSDPA Reconfiguration Prepare message. The HSDPA Setup Request message is used when setting up a channel to initially perform the HSDPA service, and the HSDPA Reconfiguration Prepare message is used when the channel set up for the HSDPA service is changed. A detailed description of the new NBAP messages for channel setup for the HSDPA service or for a change in the setup channel, i.e., the HSDPA Setup Request message and the HSDPA Reconfiguration Prepare message, will be made later.

The Node B 102 transmits information received from the RNC 101 over a previously assigned common channel so that all of the UEs existing in a cell region of the Node B 102 can receive the information. Here, the present invention proposes an HS-BCCH (High Speed-Broadcasting Channel) as the common channel transmitting the information. The HS-BCCH is a channel for broadcasting information commonly applied to all of the UEs being provided with the HSDPA service, i.e., the information belonging to Information Group #2. If the Node B 102 transmits the information received from the RNC 101 to all of the ULEs in the cell region of the Node B 102 over the HS-BCCH in this manner, the UEs receive the information transmitted by the Node B 102 and are then provided with the HSDPA service according to the received information. Here, not only when the information commonly applied to all of the UEs is newly generated, but also when specific information is changed while providing the HSDPA service by previously applying the commonly applied information to all of the UEs, the RNC 101 broadcasts the changed information to all of the UEs. In addition, the term "information" as used herein refers to information that should be commonly applied to all of the UEs.

Meanwhile, not only the information generated by the RNC 101 should be transmitted to the Node B 102 and all of the UEs belonging to the cell region of the Node B 102, but also the Node B 102 and all of the UEs belonging to the cell region of the Node B 102 should simultaneously perform operations according to the information transmitted by the RNC 101 at a designated time. Therefore, the information generated by the RNC 101 is transmitted along with activation time information where the above information is to be applied, and the Node B 102 and all of the UEs determine a timing point when an operation based on the information received from the RNC 101 is to be applied, using the activation time information included in the information generated by the RNC 101. However, as mentioned before, the information for the HSDPA service is transmitted over the HS-BCCH, so the UEs cannot know when the HSDPA service information will be changed, causing a burden that the UEs must continuously receive the HS-BCCH signal during communication. Therefore, the present invention proposes a method of using a version number of the HSDPA service, information so as to minimize an HS-BCCH reception burden of the UEs. Accordingly, the Node B 102 and all of the UEs in the cell region of the Node B 102 can simultaneously apply a change in the HSDPA service information using the version number in the HS-BCCH and the activation time information.

Now, a description will be made of how the Node B 102 and all of the UEs belonging to the cell region of the Node B 102 apply the above information according to the information generated by the RNC 101 using the version number and the activation time information.

It is first assumed that the information generated by the RNC 101 can be changed only at a predetermined timing point. The Node B 102 has a timer included in it, and the timer information (i.e., time information) is shared by the Node B 102 and all of the UEs using a SFN(system frame number). By using the SFN, it is possible to define a change point of the information generated by the RNC 101, i.e., define the activation time information. The activation time is defined as follows:

$$SFN \bmod N = M \quad (1)$$

(Please replace the equation (1) with "SFN mod N=M".)

In Equation (1), the timing points a value of SFN mod N=M become information change points, and N is an information transmission period. The N has a previously determined value or a unique value assigned to the cell, and is previously transmitted to the UEs. Therefore, the information change points are determined as the values having a remainder M, obtained by dividing the SFN by N. As stated above, the present invention defines a time period between the information change points as the information transmission period N. For example, the N value may become 4, 8 or 16. Alternatively, the N value may become 256 in order to increase the information transmission period N. For example, the M value may become 0. Therefore, if the N value is 16 and the M value is 0, then the information change points where application of given information (i.e., the changed information) starts may become the points of a multiple of 16 among the SFNs. The changed information should be given to the Node B 102 and all of the UEs before an application point of the changed information for the HSDPA service.

Next, information transmission by the Node B and the information application points will be described with reference to FIG. 2.

Figure 2:
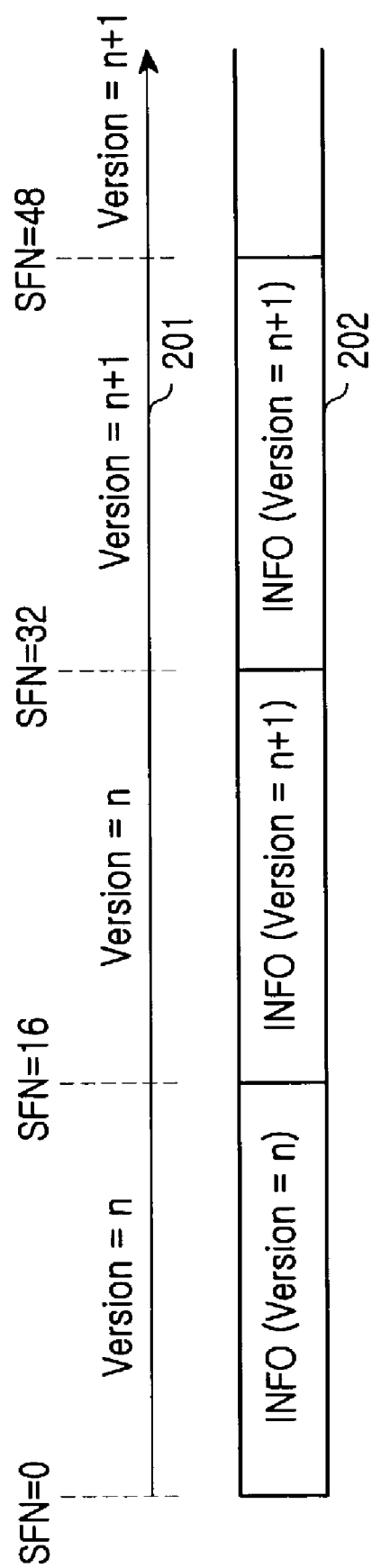
FIG. 2 illustrates information transmission by a Node B and the information application points according to an embodiment of the present invention.

FIG. 2 illustrates information transmission by a Node B and the information application points according to an embodiment of the present invention. It is first assumed in FIG. 2 that the N value is 16 and the M value is 0, so the information change point becomes a point where the SFN is a multiple of 16 and the information transmission period becomes 16. In FIG. 2, reference numeral 201 represents a time axis of the Node B 102, and also represents an information change point where the HSDPA service information is applied. Here, since the N value is assumed to be 16, the information change point appears at a point where the SFN becomes a multiple of 16. Further, it is assumed that the information transmission period is defined as a multiple of N. Here, the information change point can be previously set between the Node B 102 and the UEs like the information transmission period following the information transmission period where the changed information is transmitted. Alternatively, the changed information can be transmitted along with the information change point where the changed information is to be applied, i.e., the activation time information.

Since the time axis of the Node B 102 is identical to a time axis of the UEs, the UEs, e.g., the UE 103 receives HSDPA service-related changed information from the Node B 102 at the information change point. For example, as illustrated in FIG. 2, the UE 103 receives corresponding changed information 202 at information change points where SFN is a multiple of 16, e.g., an information change point with SFN=0, and analyzes a version of the received changed information 202. Further, in order to apply the changed information for the HSDPA service from a frame with SFN=32, the Node B 102 transmits the changed information between a frame with SFN=16 and a frame with SFN=31 so that all of the UEs in the cell region of the Node B 102 can receive the changed information. Therefore, all of the UEs in the cell region of the Node B 102 completely receive the changed information for the HSDPA service before the SFN becomes 32, and are provided with the HSDPA service by applying the newly changed information from the frame with SFN=32. Additionally, in order to apply the changed information for the new HSDPA service from the frame with SFN=32, the Node B 102 transmits the changed information for the new HSDPA service before the frame with SFN=32, so that the Node B 102 transmits to the UE 103 the changed information for the HSDPA service using the frames existing between the frame with SFN=16 and the frame with SFN=31. After transmitting the changed information for the new HSDPA service, the Node B 102 provides the HSDPA service by applying the new information from the point with SFN=32.

Here, the new information, i.e., the changed information for the HSDPA service, is transmitted by the Node B 102 to all of the UEs in the cell region of the Node B 102 over the HS-BCCH. Accordingly, the HS-BCCH is implemented in a modified form of the existing BCCH. For transmission over the HS-BCCH, the Node B 102 generates information in the form of TBs(transport blocks), and transmits the generated TBs to the UEs. Alternatively, the Node B 102 generates information in the form of physical channels, and transmits the generated physical channels to the UEs.

The contents of the information, i.e., the contents of the information for the HSDPA service, include the information belonging to Information Group #2, as stated above. In addition, it is possible to add the version number to Information Group #2 so that the UEs can check a change in the HSDPA service information before they completely check the HSDPA service information. When the version number is added to Information Group #2, the version number can be transmitted in the form of control information of a physical channel, and this will be described with reference to FIG. 3.

Figure 3:
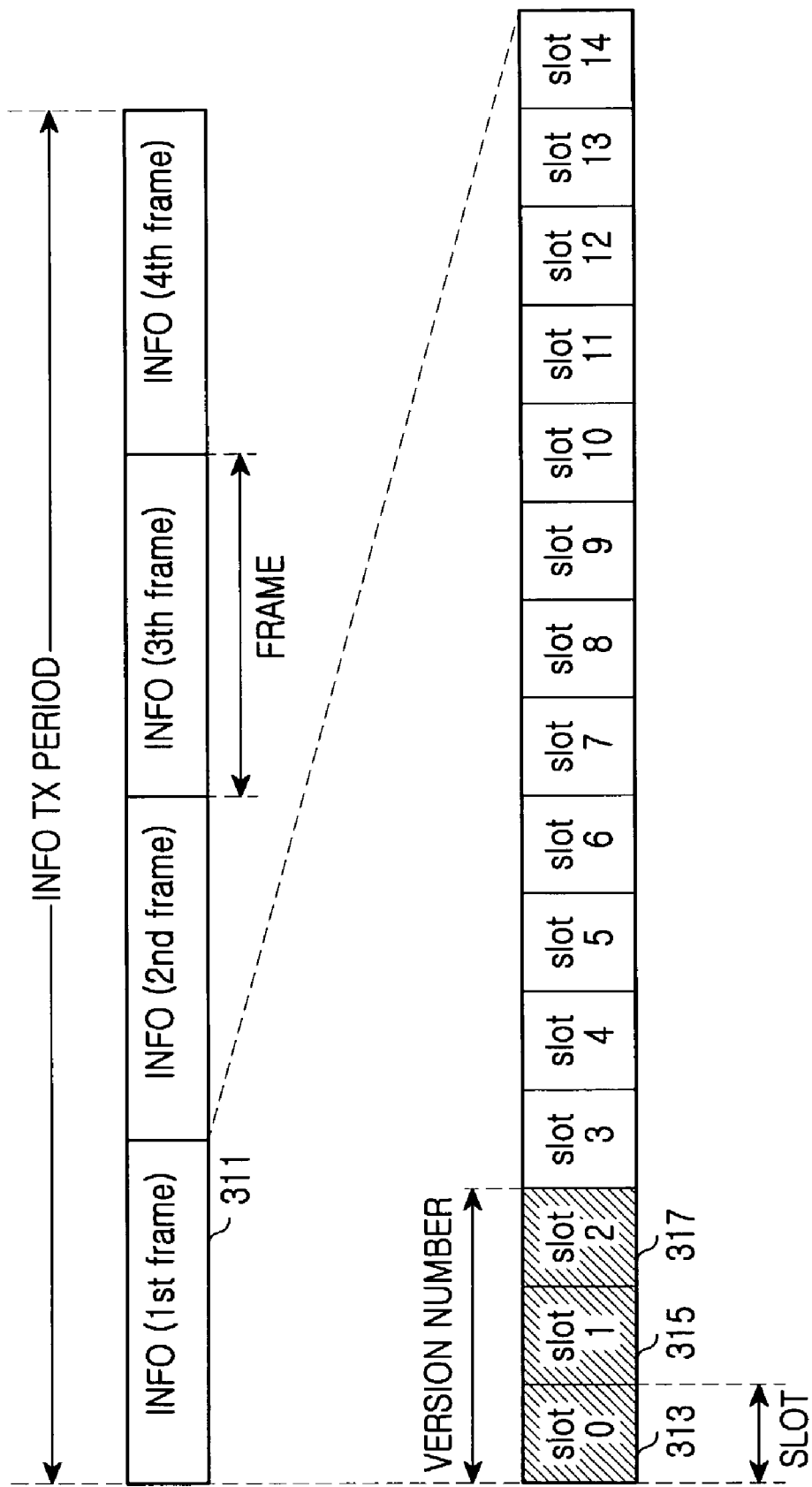
FIG. 3 illustrates an exemplary method of transmitting a version number of changed HSDPA service information according to an embodiment of the present invention.

FIG. 3 illustrates an exemplary method of transmitting a version number of changed HSDPA service information according to an embodiment of the present invention. Here, it is assumed that the information transmission period has 4 frames. As illustrated in FIG. 3, the version number can be transmitted over first several slots among the slots constituting a first frame 311 of each information transmission period, e.g., the first 3 slots slot#0 313, slot#1 315 and slot#2 317 of the first frame 311. In this case, all of the UEs check the version number by analyzing only the slots transmitting the version number in the first frame of each information transmission period. As a result of the analysis, if the analyzed version number is identical to the version number currently stored in the respective UEs, the UEs are continuously provided with the current HSDPA service using the currently stored HSDPA service information, without further analyzing the information received over the HS-BCCH. If, however, the analyzed version number is different from the currently stored version number, the UEs analyze information received over the HS-BCCH, store the information received in the current information transmission period along with the analyzed version number, and then apply new information from a start point of the next information transmission period, thereby to be provided with the HSDPA service.

In addition, if the RNC 101 has determined to change the current HSDPA service information, it transmits the information to be changed to the Node B 102 using the NBAP message. Here, as stated above, the existing NBAP message or the new NBAP message, i.e., the HSDPA Setup Request message and the HSDPA Reconfiguration Prepare message, are used for the NBAP message transmitting the HSDPA service information. The HSDPA Setup Request message is used when setting up a channel to initially perform the HSDPA service, and the HSDPA Reconfiguration Prepare message is used when the channel set up for the HSDPA service is changed. The new NBAP messages are filled with newly changed or added information, which includes the information of Information Group #2. The RNC 101 can transmit the version number of the corresponding information-by assigning it using the new NBAP message. In addition, the RNC 101 can transmit the new NBAP message with (i) an SFN value indicating a timing point when the information is to be transmitted to the UEs or a timing point when the information should be applied, or (ii) activation time information indicating the SFN. Upon receiving the NBAP message, the Node B 102 transmits information included in the NBAP message to all of the UEs existing in the cell region of the Node B 102 over the HS-BCCH.

When one UE is added to be provided with the HSDPA service, the RNC 101 transmits the current HSDPA service-related information to the UE over a DCCH (Dedicated Control Channel). Here, The information transmitted at this time includes the information belonging to Information Group #2. In addition, the RNC 101 can additionally transmit a version number of the HSDPA service information to the UE. Upon receiving the above information, the UE receives the HS-BCCH before starting the HSDPA service, and compares the received version number with a version number given to the current HS-BCCH. As a result of the comparison, if the version numbers are different from each other, the UE receives the HS-BCCH signal, and then applies the information received over the HS-BCCH from the next information transmission period, thereby starting the HSDPA service.

Now, operations of the UE 103, the Node B 102, and the RNC 101 during the HSDPA service will be described with reference to FIGS. 4 to 6.

Figure 4:
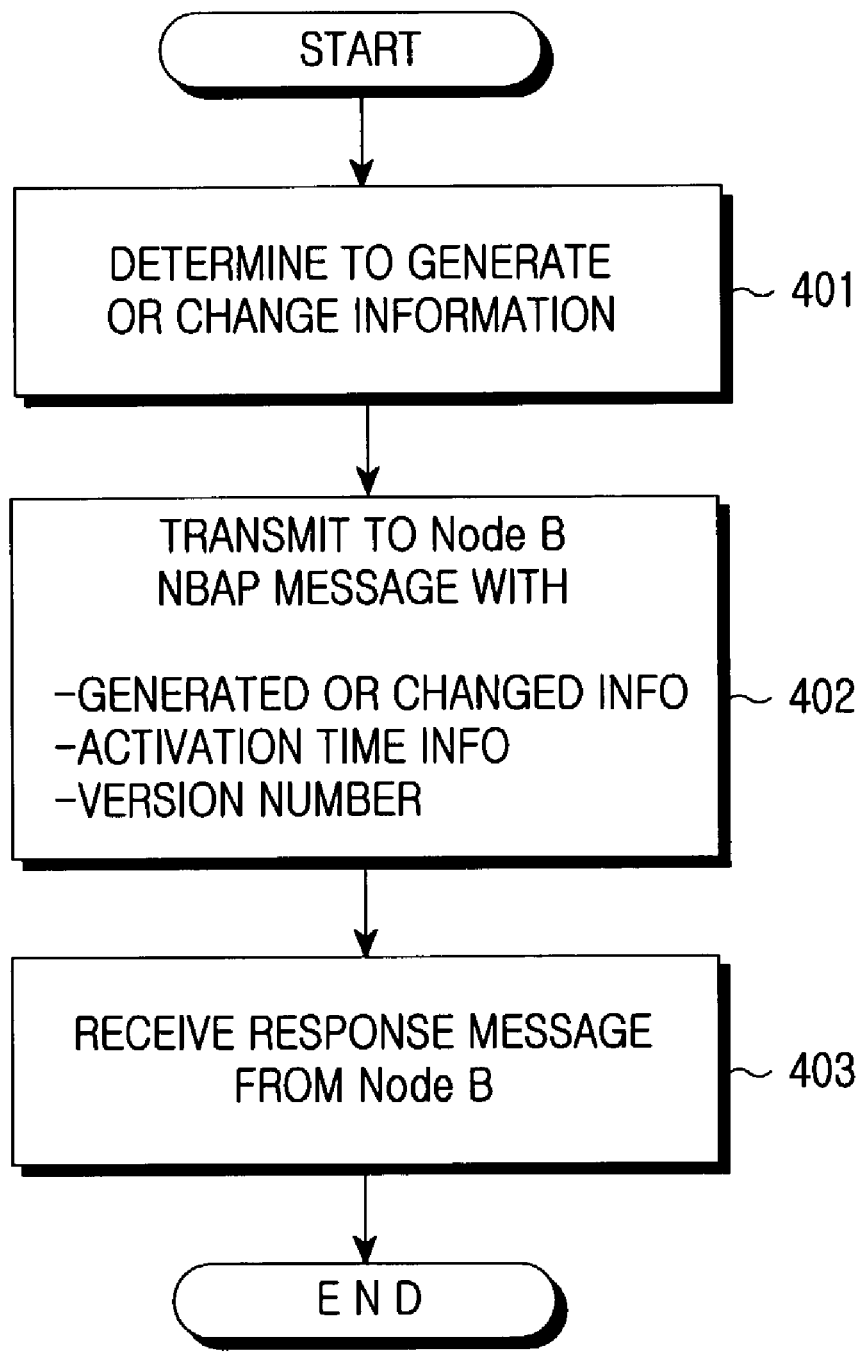
FIG. 4 illustrates an operating process of an RNC performing HSDPA service according to an embodiment of the present invention.

FIG. 4 illustrates an operating process of the RNC 101 performing the HSDPA service according to an embodiment of the present invention. Referring to FIG. 4, in step 401, the RNC 101 determines whether to generate or change the HSDPA service-related information. Here, the HSDPA service information includes the information belonging to Information Group #2. That is, the RNC 101 determines whether to generate or change the HS-PDSCH code information, the HS-SCCH code information, and the HS-PDSCH code power level information. Of course, the information defined in Information Group #1 may also be changed due to the change in the code information and the power level information. Generating and changing the information can be determined considering the number of UEs being provided with the HSDPA service, existing in the current cell, and the number of UEs being provided with another service such as a voice service. For example, as to the HS-PDSCH code information of Information Group #2, the RNC 101 can assign a predetermined number of HS-PDSCH codes in order to first start the HSDPA service. It will be assumed that the number of HS-PDSCHs is 1. In this case, however, if the number of the UEs and the HSDPA service request are increased, it may not be possible to normally provide the HSDPA service. Therefore, in this case, the RNC 101 determines whether to additionally assign the HS-PDSCH codes, so that the RNC 101 can recognize that it should change the HS-PDSCH code information. In addition, although several HS-PDSCH codes are assigned, if the number of the UEs being provided with the HSDPA service is small, an amount of data using the HS-PDSCH is small, or the number of UEs requiring the voice service is increased, then the RNC 101 may determine to decrease the number of HS-PDSCH codes assigned for the HSDPA service, so the HS-PDSCH code information should be changed.

In step 402, the RNC 101 transmits the generated or changed information to the Node B 102. At this point, the RNC 101 transmits the generated or changed information along with the activation time information and the version number. Here, the NBAP message used in transmitting the generated or changed information from the RNC 101 to the Node B 102 is a new NBAP message, i.e., an HSDPA Setup Request message for the generated information and an HSDPA Reconfiguration Prepare message for the changed information. The activation time information may represent an actual application timing point when the RNC 101 desires to apply the generated or changed information. Alternatively, the RNC 101 may inform the UE 103 of a timing point when the changed information is transmitted, and then apply the information from a certain information transmission period according to a predetermined rule.

In step 403, the RNC 101 receives a response message corresponding to the transmitted NBAP message, from the Node B 102, and then ends the process. The RNC 101 stores a version number of the Node B 102, and uses the stored version number to generate the next information and accessing a new UE For example, the response message received from the Node B 102 may be an HSDPA Reconfiguration Prepare message. The response message may include information on information application possibility, and may also include a timing point when the Node B 102 is to apply the generated or changed information. For the HSDPA service, the RNC 101 determines whether to change or generate the information and transmit the changed information to the Node B 102. The Node B 102 transmits the changed information to the UE 103. Alternatively, the RNC 101 may transmit the changed information to both the Node B 102 and the UE 103. In an embodiment of the present invention, the RNC 101 transmits the changed information to the Node B 102 using the NBAP message, and the Node B 102 transmits the received changed information to the UE 103 through an RRC (Radio Resource Control) message, by way of example.

Figure 5:
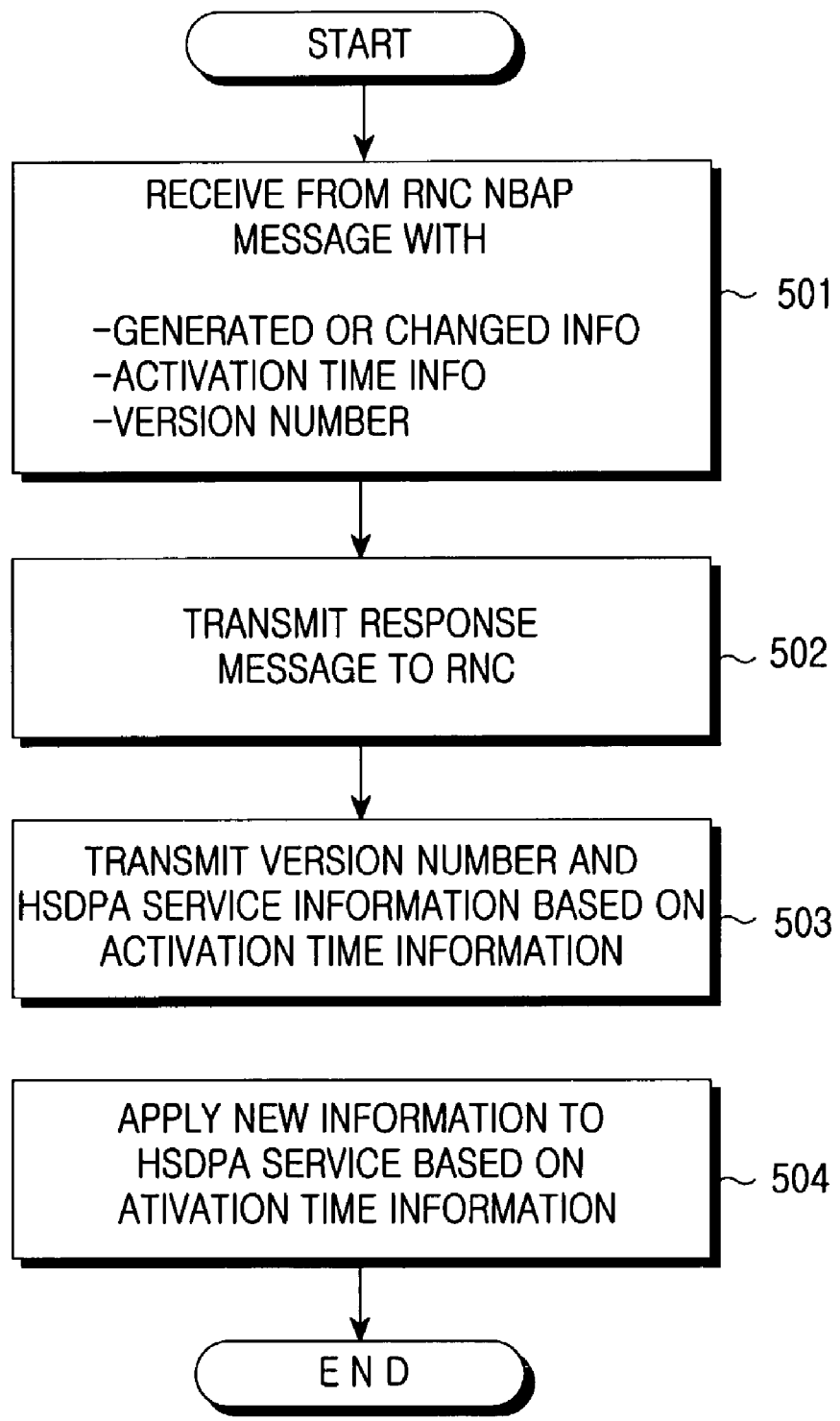
FIG. 5 illustrates an operating process of a Node B performing HSDPA service according to an embodiment of the present invention.

FIG. 5 illustrates an operating process of the Node B 102 performing the HSDPA service according to an embodiment of the present invention. Referring to FIG. 5, in step 501, the Node B 102 receives the NBAP message including the generated or changed HSDPA service-related information from the RNC 101. Here, the HSDPA service-related information refers to the information related to the HSDPA service such as Information Group #2. The information received from the RNC 101 includes the version number and the activation time information. The reason that the RNC 101 transmits the NBAP message with the version number and the activation time information is to enable the UE 103 and the Node B 102 to apply the generated or changed HSDPA service-related information in synchronism with each other. The version number is information used for receiving the changed information only at the changed point, instead of continuously checking the actual data whether the HSDPA service-related information is changed. The activation time information is information used when the UE 103 and the Node B 102 apply the changed information in synchronism with each other. In step 502, the Node B 102 transmits a response message in acknowledgement of the NBAP message to the RNC 101. Here, since the HSDPA service-related information is received from the RNC 101 through the NBAP message, the Node B 102 transmits a response message, e.g., an HSDPA Reconfiguration Response message to the RNC 101. In step 503, the Node B 102 transmits the HSDPA service-related information received in step 501 over the HS-BCCH at the activation time to the UEs 103. That is, the Node B 102 changes and transmits the currently transmitted HS-BCCH information using the version number and the activation time information received in step 501. The information transmitted at this time is transmitted together with a new version number at a start point of the information transmission period. Further, since the information received in step 501 is transmitted through the NBAP message, the Node B 102 checks the changed information by analyzing the NBAP message. In addition, when transmitting this information to all of the UEs existing in the cell region of the Node B 102, the Node B 102 should change the information in the format of the RRC message. Here, the format of the RRC message transmitting the changed information may be similar to the format of a message transmitting the system information among the existing RRC messages. In addition, the Node B 102 may transmit the information received from the RNC 101 to the UEs in the same manner as the method of changing the message in the format of the RRC message and then transmitting the RRC message to the existing UEs. Further, the RRC message generated by the Node B 102 includes the information received from the RNC 101, i.e., the information changed or generated by the RNC 101 for the HS-PDSCH code power level information, HS-DSCH code information and HS-SCCH code information according to a request frequency of a DCH (Dedicated Channel) or a voice channel or a channel using state of the cell. Further, the RRC message may include the version number. In addition, the RRC message may include the activation time information indicating a timing point when the Node B 102 and the UE 103 simultaneously apply the changed or generated information received at the UE 103 in synchronism with each other.

In step 504, the Node B 102 provides the HSDPA service to which new information is applied at a start point of the next information transmission period, after transmitting the above information. When the activation time information indicating the timing point when the above information is to be applied is additionally included in step 503, the Node B 102 may apply the new information at the timing point indicated by the activation time information. A description will be made of an embodiment of applying the above information with reference to the HS-PDSCH code information included in Information Group #2.

When the HS-PDSCH code information is changed, the Node B 102 transmits the HS-DSCH channelization code information to the UE 103 by applying the HS-PDSCH code information changed while transmitting the HS-DSCH channelization code information of Information Group #1 to the UE. 103 For example, when the number of the exiting HS-PDSCH codes is 2 and the channelization code information is transmitted to the UE 103, the Node B 102 may either directly inform the UE 103 of the HS-PDSCH codes or assign sequence numbers to the HS-PDSCH codes and then inform the UE 103 of the order. When the changed information indicates that the number of HS-PDSCH codes is increased to 3, the Node B 102 changes the sequence numbers assigned to the HS-PDSCH codes. Therefore, after the change point, the Node B 102 transmits the newly set sequence numbers to the UE 103, or directly transmits the channelization codes, i.e., the HS-PDSCH codes.

Figure 6:
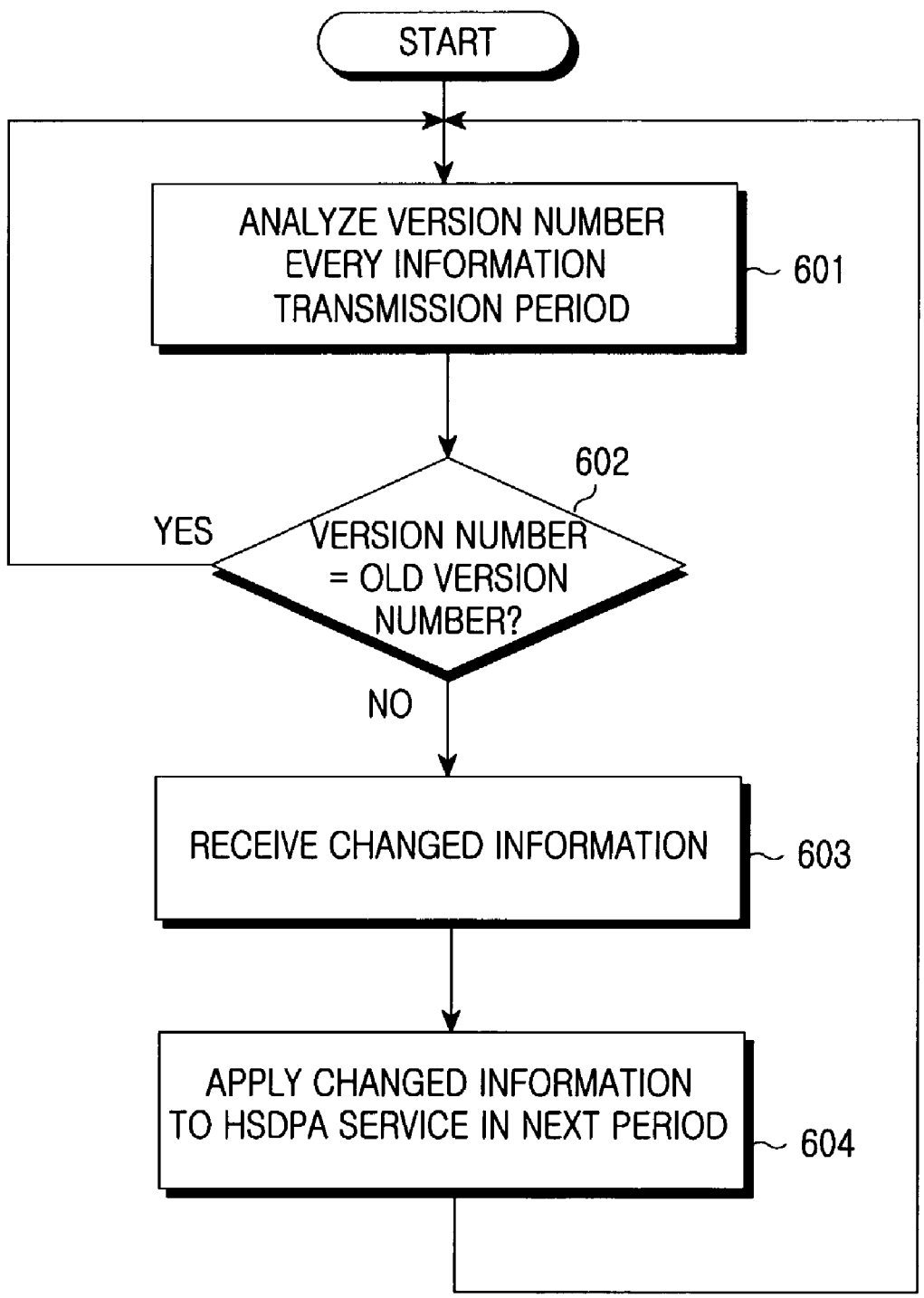
FIG. 6 illustrates an operating process of a UE performing HSDPA service according to an embodiment of the present invention.

FIG. 6 illustrates an operating process of the UE 103 performing the HSDPA service according to an embodiment of the present invention. Referring to FIG. 6, in step 601, the UE 103 checks a version number every information transmission period. Here, the version number can be transmitted at the first frame of each information transmission period as described in conjunction with FIG. 3, and the version number can be transmitted in the format of a signaling message of a physical channel. In this case, the version number is located in a certain frame in the information transmission period, and the number of slots capable of indicating the version number in the frame is arbitrarily set to 3. Of course, the number of slots is variable. In this case, the physical layer of the UE 103 analyzes the version number every information transmission period, thereby determining whether the analyzed version number is identical to the version number currently stored in the UE 103. In addition, when the version number is transmitted by an upper signaling message along with other information, the version number is analyzed in the upper layer, not the physical layer, and then compared with the currently stored version number to determine whether they are different from each other. In order to compensate for lack of time to receive the information after receiving the version number, the version number may be transmitted at a specific position of an information transmission period preceding the corresponding information transmission period. Therefore, the UE 103 additionally receives the changed information after analyzing the version number.

In step 602, if the -analyzed version number is identical to the currently stored version number, i.e., if the information is not changed or generated, the UE 103 returns to step 601. However, if the analyzed version number is different from the currently stored version number, i.e., if the RNC 101 has changed or generated the HSDPA service-related information and then transmitted the information to the UE 103 through the Node B 102, the UE 103 goes to step 603. In step 603, the UE 103 receives the changed information in the corresponding information transmission period, and then proceeds to step 604. The UE 103 stores the received information together with the version number received in the same information transmission period. The information transmitted from the Node B 102 may have a format of the RRC message, so the RRC layer of the UE 103 can receive the above information and then transmit the received information to either a MAC (Medium Access Control) layer for the HSDPA service, i.e., MAC-h (MAC-high speed) layer, or the physical layer.

In step 604, the UE 103 is provided with the HSDPA service by applying the received changed information from the start point of the next information transmission period. An application point of the changed information can be changed according to a rule previously agreed between the UE 103 and the Node B 102. Since it is purposed that the Node B 102 and the UE 103 simultaneously apply the changed information, the application point is changed according to a transmission method of the activation time information. That is, as described above, the Node B 102 transmits the activation time information to the UE 103 by designating a transmission point to the UE 103 or an application point. Since the transmitted information includes the HSDPA service information, the UE 103 newly analyzes the information transmitted by the Node B 102 using the changed information. The changed information may include Information Group #2. For example, when the HS-SCCH code information is changed, if the HS-SCCH code is additionally assigned, the UE 103 is not required to receive the added HS-SCCH code and the existing HS-SCCH code in order to receive Information Group #1 for the HSDPA service, after the corresponding change point, i.e., the start point of the next information transmission period or a change point specified by the Node B 102. Alternatively, when the HS-PDSCH code power level information of Information Group #2 is changed, the UE 103 uses the HS-PDSCH code power level during QAM (Quadrature Amplitude Modulation) demodulation.

As described above, the communication system using the HSDPA service according to the present invention simultaneously equally applies the HSDPA service information in both the Node B and the UE, contributing to an increase in efficiency of the HSDPA service. Further, in the communication system using the HSDPA service, the RNC transmits the version number of the HSDPA service information along with the activation time information where the above information is to be actually applied, so that the Node B and the UE apply the HSDPA service information transmitted by the RNC in real time, thereby increasing HSDPA service efficiency. In addition, the UE determines whether the HSDPA service information transmitted by the RNC is changed, only in a specific period, thereby minimizing power consumption of the UE.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting to a plurality of UEs (User Equipments) information commonly applied to the plurality of UEs in a cell occupied by a Node B connected to an RNC (Radio Network Controller), comprising the steps of:
   generating changed commonly applied information including an indicator indicating the information has changed, when the commonly applied information is changed
   repeatedly transmitting to the UEs the changed information including the indicator indicating the changed information, the changed information being transmitted before transmitting HS-DSCH (High Speed Downlink Shared Channel) channel signals; and
   transmitting to the UEs the changed information along with activation time information indicating the activation time point when the changed information is to be applied.

2. The method as claimed in claim 1, wherein the commonly applied information includes code information of a common channel transmitting data, code information of a control channel transmitting control information of the common channel, and power information of the common channel.

3. A method for transmitting to a plurality of UEs (User Equipments) information commonly applied to the plurality of UEs in a cell occupied by a Node B connected to an RNC (Radio Network Controller), comprising the steps of:
   determining whether the commonly applied information is changed;
   repeatedly transmitting to the UEs the changed commonly applied information including an indicator indicating the information has changed when the information is changed, the changed commonly applied information being transmitted before transmitting HS-DSCH (High Speed Downlink Shared Channel) channel signals;
   transmitting to the UEs the changed information along with activation time information indicating the activation time point when the changed information is to be applied; and applying the changed information from a predetermined desired activation time point.

4. The method as claimed in claim 3, wherein the commonly applied information includes code information of a common channel transmitting data, code information of a control channel transmitting control information of the common channel, and power information of the common channel.

5. A method for transmitting to a plurality of UEs (User Equipments) information commonly applied to the plurality of UEs in a cell occupied by a Node B connected to an RNC (Radio Network Controller), comprising the steps of:
   receiving, when the commonly applied information changes, at the Node B from the RNC the commonly applied information and an indicator indicating that the commonly applied information is changed;
   transmitting at a predetermined time the received commonly applied information and indicator to the UEs through a specific channel broadcasting the commonly applied information, the changed commonly applied information and the indicator being transmitted before transmitting HS-DSCH (High Speed Downlink Shared Channel) channel signals;
   transmitting to the UEs the changed information along with activation time information indicating the activation time point when the changed information is to be applied; and
   applying the received commonly applied information to the EUs from a predetermined desired activation time point.

6. The method as claimed in claim 5, wherein the indicator is transmitted at a first frame among frames constituting an information transmission period for which the commonly applied information is transmitted.

7. The method as claimed in claim 5, wherein the specific channel is a HS-BCCH (high-speed broadcasting channel).

8. A method for receiving commonly applied information in a UE (User Equipment) in a mobile communication system for transmitting to a plurality of UEs information commonly applied to the plurality of UEs in a cell occupied by a Node B connected to an RNC (Radio Network Controller), comprising the steps of:

determining whether the commonly applied information is changed, by monitoring a specific channel every information transmission period for which the commonly applied information is changed;

receiving the changed commonly applied information, when the commonly applied information is changed, the changed commonly applied information being received before receiving HS-DSCH (High Speed Downlink Shared Channel) channel signals; and receiving a service provided from the RNC by applying the received changed commonly applied information from a predetermined desired activation time point, wherein the specific channel includes in a first frame of the information transmission period (i) an indicator indicating that the commonly applied information is changed and (ii) activation time information indication the activation time point when the changed commonly applied information is to be applied.

9. The method as claimed in claim 8, wherein the activation time point represents a point corresponding to a next information transmission period or the activation time information.

10. The method as claimed in claim 8, wherein the specific channel is a HS-BCCH (high-speed broadcasting channel).

11. The method as claimed in claim 8, wherein the information transmission period represents a time period between information change points where the commonly applied information is changed or generated.

12. A method for receiving commonly applied information in a UE (User Equipment) in a mobile communication system for transmitting to a plurality of UEs information commonly applied to the plurality of UEs in a cell occupied by a Node B connected to an RNC (Radio Network Controller), comprising the steps of:

receiving an indicator indicating that the commonly applied information is changed, by monitoring a specific channel every information transmission period for which the commonly applied information is changed;

receiving the changed commonly applied information, when the commonly applied information is changed, the changed commonly applied information being received before receiving HS-DSCH (High Speed Downlink Shared Channel) channel signals; and receiving a service provided from the Node B by applying the received changed commonly applied information at a predetermined time, wherein the specific channel includes in a first frame of the information transmission period (i) the indicator and (ii) activation time information indicating a timing point when the changed commonly applied information is to be applied.

13. The method as claimed in claim 12, wherein the activation time point represents a point corresponding to a next information transmission period or the activation time information.

14. The method as claimed in claim 12, wherein the specific channel is a HS-BCCH (high-speed broadcasting channel).

15. The method as claimed in claim 12, wherein the information transmission period represents a time period between information change points where the commonly applied information is changed or generated.

16. The method as claimed in claim 1, further comprising the step of applying the changed information from a predetermined desired activation time point.

17. The method as claimed in claim 3, further comprising the step of applying the changed information from a predetermined desired activation time point.

18. The method as claimed in claim 5, further comprising the step of applying the received commonly applied information from a predetermined desired activation time point.

* * * * *